United States Patent Office 3,337,743
Patented Aug. 22, 1967

3,337,743
PHASE-CONTROL SYSTEM, AND STANDBY POWER-SUPPLY AND BATTERY-CHARGING MEANS INCORPORATING THE SAME
Paul E. Rolfes, Costa Mesa, Calif., assignor, by mesne assignments, to Lorain Products Corporation, Lorain, Ohio, a corporation of Ohio
Filed Mar. 13, 1964, Ser. No. 351,676
17 Claims. (Cl. 307—66)

This invention relates to a method and apparatus for comparing and controlling the phases of A.C. voltage waves. More specifically, the present invention relates to an apparatus in the nature of a servo, being adapted to sense the phase difference between first and second voltage waves and to employ such differences to bring the waves into a desired phase relationship. The invention also relates to a standby power-supply and battery-charging method and apparatus incorporating the phase-control system.

The present invention is particularly adapted to be utilized in combination with the system which is described and claimed in co-pending patent application Ser. No. 337,621, filed Jan. 14, 1964, for a Continuously-Operating Standby Power-Supply and Battery-Charging Apparatus and Method, inventor Robert S. Jamieson.

The circuit described in the cited patent application incorporates a sync gate which prevents gross phase differences between the voltage wave in an A.C. power line and the voltage wave generated by an inverter which is associated with such line in order to supply power in the event of line failure. Such sync gate circuit is in the nature of a go-no go system, in that it prevents transmission of sync signal during periods when the inverter voltage and the line voltage are generally 180 degrees out of phase. The present phase sensing and regulating means is, on the other hand, a continuously adjustable automatic system adapted to effect a fine phase adjustment.

It is an object of the present invention to provide a method and apparatus for causing the phase of the output voltage wave from the standby power-supply system to be substantially in phase with the line voltage wave during the period when the line is first connected to the inverter after a period of standby operation, thereby substantially preventing transient shock effects such as would tend to adversely affect the line or the load connected thereto.

When, after a period of standby operation caused by line power failure, the line is first reconnected to the output of the standby power-supply system, such standby system continues to supply energy to the load associated with the line. This is, as explained in the cited patent application, because of the above-indicated phase registry (in-phase relationship) between the line voltage wave and the voltage wave from the standby power-supply system. It is, however, highly desirable to shift the load from the standby system to the line, thereby preventing drainage of energy from the storage batteries incorporated in the standby system. Such a transfer of power sources should be done slowly and smoothly in order to avoid undesirable transient conditions in the line.

In view of the above, it is a further important object of the present invention to provide a method and apparatus for achieving an extremely smooth transfer of power sources, from the standby system to the line, thereby preventing substantial transients and assuring that the storage batteries of the standby system will remain charged.

The system described in the cited patent application effects recharging of the storage batteries, after a period of standby operation, by causing the phase of the inverter output voltage wave to lag behind the phase of the line voltage wave. This is preferably accomplished by shunting in varying degrees the capacitor portion of a phase-shifting network, in such manner as to change the phase of the sync signal supplied to the inverter. Such a system is only operative during periods when the line is connected and therefore can supply energy to the standby system for battery-charging purposes.

It is a further important object of the present invention to provide a phase-control circuit which operates during periods when the line is open (the line-power source being disconnected from the standby system), and which utilizes the same phase-shift network, sync generator, etc., that ar employed for battery-charging purposes when the line-power source is connected to the standby system, without the necessity of employing any switching operation of any sort.

These and other objects will become apparent from the following detailed description taken in connection with the accompanying drawings in which:

FIGURE 1 is a diagram which illustrates schematically the standby power-supply and battery-charging apparatus and method described and illustrated in said application Ser. No. 337,621, as modified to incorporate the present phase-control system; and FIGURE 2 is a wiring diagram illustrating one embodiment of the phase control of the present invention.

Referring first to FIGURE 1, a conventional 60-cycle 120-volt A.C. power line is indicated at 10, having interposed therein a line control 11. The input terminals of the line 10 are indicated at 12 and are adapted to be connected to a suitable A.C. power source such as a central power station or a portable alternator. The output terminals 13 of the line are adapted to be connected to a suitable load such as a computer, microwave relay, etc.

Line control 11 is adapted to open the line automatically in response to various undesired line conditions, for example during periods when the magnitude of the line voltage is excessively high or low. During such periods, power is supplied to output terminals 13 by the standby power-supply system described in the cited patent application. Upon cessation of the undesirable line-voltage condition, the line control 11 closes (after a predetermined time-delay period) and causes the line to supply energy not only to the output terminals 13 but (for battery-charging purposes) to the standby power-supply system itself. As noted above, this change in energy sources (from standby system to the line) does not occur instantly but, because of the present invention, occurs in a gradual manner devoid of undesirable transients.

The standby power-supply and battery-charging system described in the cited application comprises a parallel square-wave SCR inverter incorporating reactance diodes, such inverter being numbered 14 in the present application and corresponding to inverter 13 in the cited application. The output of the inverter 14 is connected through a ferroresonant transformer 15 (also numbered 15 in the cited application) to line 10 on the output side of the line control 11. Inverter 14 and the primary of transformer 15 are connected in circuit with a storage battery 16 (numbered 14 in the cited application). This circuit includes a positive power lead 17 (numbered 36 in the cited application) and a negative power lead 18 (numbered 26 in the cited application).

When line control 11 (numbered 19 in the cited application) is open, power is delivered from battery 16 to line 10 and the associated load connected to output terminals 13, the current flowing in a generally clockwise direction through lead 17, the primary of transformer 15, inverter 14, and lead 18 back to battery 16. When line control 11 is closed, the energy supplied to output terminals 13 is normally received from the line 10, and the battery 16 may be charged from such line by means of current flowing in a generally counterclockwise direction through lead 17, battery 16, lead 18 and inverter 14.

A sensing transformer 19 (numbered 17 in the cited application) is connected across line 10 on the input side of line control 11, the secondary of such transformer being connected through leads 20 and 21 to the input of a sync generator and sync gate represented schematically at 22. The circuit 22 employs the signal thus derived from line 10 to drive a gate signal generator 23 which, in turn, drives the gates of the SCR's in inverter 14. Circuit 22 corresponds to circuits 42 and 43 in the cited application, whereas circiut 23 in the present application corresponds to circuits 44 and 45 in the cited application.

A battery charge control, numbered 24 in the present application and 101 in the cited application, is adapted to sense the voltage of battery 16 and to shift the phase of the voltage wave generated by inverter 14 in a manner resulting in the desired charging of battery 16. The battery charge control includes a lamp or bulb 25 (numbered 107 in the cited application) which is optically coupled with a light-dependent variable resistor 26 (numbered 115 in the cited application). Resistor 26 is shunted across a capacitor 27 (numbered 49 in the cited application) which is interposed in lead 21. Capacitor 27 cooperates with an inductor 28 (numbered 48 in the cited application) to form a phase-shift network adapted to shift the phase of the sync signal delivered from sensing transformer 19 to the sync generator and gate 22.

When the voltage across battery 16 is relatively low, for example, following a period of inverter (emergency) operation during which line control 11 is open, the battery charge control 24 operates in such manner as to cause lamp 25 to glow brightly. When the lamp 25 is bright, it reduces the resistance of the associated light-dependent resistor 26 from an order of magnitude in the megohm range to a few hundred ohms, thus substantially shorting out the capacitor 27. When capacitor 27 is thus substantially shorted, the inductive reactance created by inductor 28 predominates over the capacitive reactance of capacitor 27, and causes the phase of the sync signal to lag. The output of inverter 14 lags correspondingly, which operates to effect the above-indicated charging of battery 16 from the line 10. Such action occurs, of course, only after line control 11 is closed so that power may be derived from the line.

When the battery is substantially fully charged, charge control 24 causes lamp 25 to be dim, so that the resistance of light-dependent resistor 26 is high and capacitor 27 is not shorted out. The capacitive reactance of capacitor 27 thus causes the sync signal delivered to circuit 22 to become leading in nature, so that the output of inverter 14 becomes more nearly in phase with the line voltage wave. In the indicated manner, the phase relationship may be changed until charging of the battery ceases, or until the battery delivers energy into the line (if the battery charge is excessively high).

It is to be understood that the phase shift which occurs in various portions of the circuitry, for example in transformer 15, may be suitably compensated for in various ways, for example by adjusting the magnitudes of elements 27 and 28.

The sync generator and sync gate 22 have associated therewith a sensing transformer 29 (numbered 18 in the cited application) which is associated with line 10 on the output side of line control 11. Such sensing transformer 29 cooperates with the circuit 22 and with the first-mentioned sensing transformer 19 to insure that the output of the standby power-supply system will be generally in phase with the line voltage wave prior to closing of line control 11. By "generally in phase" it is meant that these voltage waves are more nearly in the inphase condition than in the out-of-phase condition. Thus, as above indicated, the indicated circuitry 19, 22 and 29 provides a rough phase control, being in the nature of a go-no go system as distinguished from a continuously adjustable automatic system.

*General description of the phase control method and apparatus of the present invention, particularly as related to the standby power-supply and battery-charging system described in the cited application*

The phase control of the present invention is designated generally by the reference numeral 30, having associated therewith sensing transformers 31 and 32 which are connected with the line on opposite sides of line control 11. The secondaries of the sensing transformers 31 and 32 (numbered 33 and 34, respectively) transmit to the phase-control means 30 signals having phases which are respectively related to the phases of the line voltage wave (on the input side of line control 11) and the inverter output-voltage wave (on the output side of line control 11, which is then in open-circuit condition). As will be described in detail hereinafter relative to FIGURE 2, the phase control 30 compares the phases of the signals thus derived from the line and the inverter output, and causes a lamp 35 to be illuminated in response to the degree of phase difference. When the phase difference between the indicated voltage waves is great, lamp 35 is relatively dark. When the voltage waves on opposite sides of the open line control 11 are substantially in phase, lamp 35 is relatively bright. Lamp 35 has optically coupled therewith a second light-dependent variable resistor 36 which corresponds generally to resistor 26 and is connected in series-circuit relationship relative thereto across the capacitor 27.

It is an important feature of the invention that the two light-dependent resistors 26 and 36 may be associated with the phase-shift network 27–28, and thus with the sync generator and sync gate 22, yet may perform different functions for different purposes at different times. When line control 11 is closed, the voltages sensed by transformers 31 and 32 and transmitted to phase control 30 are exactly in phase with each other, causing lamp 35 to glow brightly and thus reduce the resistance of resistor 36 to a few hundred ohms. Except during short intervals following periods of emergency (inverter) operation, when the battery 16 is being recharged heavily, the lamp 25 associated with battery charge control 24 is then relatively dim since the battery is normally maintained in a substantially charged condition. It follows that the resistance of resistor 26 is then high, so that such resistor then dominates resistor 36 and controls the phase of the sync signal in accordance with the charging requirements of battery 16. Thus, during normal operation when line control 11 is closed, the battery charge control 24 dominates the phase control 30.

When line control 11 is open, so that the standby system is operating to supply energy to output terminals 13 of the line, the charge on battery 16 is rapidly reduced and causes the lamp 25 to glow brightly, the resistance of resistor 26 then being low. During such period of time, the phase control 30 causes lamp 35 to glow relatively dimly since the signals on opposite sides of the open line control 11 are (normally) not exactly in phase. Thus, when line control 11 is open the resistor 36 has a relatively high value and dominates the resistor 26 to control the phase of the sync signal as is desired.

Following an interval of emergency (inverter) operation, battery 16 will normally be relatively discharged as indicated above. Thus, lamp 25 will be glowing brightly whereas lamp 35 will be relatively dim due to the somewhat out-of-phase relationship between the voltages on opposite sides of the open line control. Immediately upon closing of line control 11, the voltages sensed by transformers 33 and 34 will be exactly in phase with each other, so that the phase control 30 will tend to cause lamp 35 to glow very brightly. However, as will be described hereinafter, the phase control 30 incorporates a time-delay means 37 (FIGURE 2) which causes the lamp 35 to become progressively brighter over a period of seconds, as distinguished from instantaneously. It follows that the transfer of control from the circuit 30 to the circuit 24 is effected in a gradual manner subsequent to closing of line 11, with consequent prevention of undesired transient effects.

At the end of the time-delay period created by the presence of the time-delay means 37, both lamps 25 and 35 will be glowing relatively brightly, so that capacitor 27 will be substantially completely shorted and a lagging signal will be transmitted from sensing transformer 19 to sync generator and sync gate 22. Thus, as described in detail in the cited application, the system will be operative to effect rapid charging of battery 16 from line 10. Such charging causes the lamp 25 to glow progressively less brightly, until it dominates the lamp 35 as previously described.

There exist certain situations in which the battery 16 may remain charged during a period of emergency (inverter) operation, for example when such period is relatively short. It is necessary that means be provided to prevent the then-dark lamp 25 of battery charge control 24 from dominating the lamp 35 of phase control 30 at the end of such periods, so that the phase control may achieve an in-phase condition permitting closing of the line control. This is accomplished by providing a resistor 38 in shunt with resistor 26.

Resistor 38 has a magnitude selected to prevent the magnitude of the parallel combination of resistors 26 and 38 from becoming excessively great. Thus, resistor 38 has a value sufficiently low to prevent light-dependent resistor 26 from dominating (regardless of the degree of darkness of bulb 25) the light-dependent resistor 36 during periods when line control 11 is open. On the other hand, the fixed resistor 38 has a magnitude sufficiently great to prevent light-resistor 26 from being rendered unable to control the charging of battery 16 during periods when line control 11 is closed. Thus, when the line control 11 is closed, the parallel combination of resistors 26 and 36 should present a resistance sufficiently great (resistor 36 being ineffective due to the brightly illuminated condition of bulb 35) to permit a slight (but not excessive) amount of discharge of battery 16 when bulb 25 is dark.

It is to be noted that the above discussion, concerning periods when line control 11 is open, assumes that the normal line voltage is being supplied to input terminals 12 so that it is desired to achieve a phase correlation permitting line control 11 to be closed. When the line 10 is dead and line control 11 is accordingly open, the conditions of both bulbs 25 and 35 are immaterial. This is because there can then be no charging of battery 16, and there can be no control of relative phases. Upon resumption of normal power to the input terminals 12 of the line, the phase control 30 immediately becomes operative, as described above, to effect a substantial phase registry between the line voltage wave (sensed by transformers 19 and 31) and the inverter voltage wave (sensed by transformers 29 and 32).

As described in the cited patent application, the line control 11 incorporates a time-delay means which prevents closing thereof until a predetermined time period after the normal line voltage wave is present at input terminals 12 of the line. Such time period is sufficiently long to permit the phase control 30 to effect the described phase correlation, so that line control 11 may be closed without creating substantial transient conditions.

It is to be noted that both the battery-charge control system and the phase-control system are in the nature of closed-loop servos, although lamps and light-dependent resistors are employed in place of motors (it being understood, however, that motor-driven reactances and other circuitry could be employed in the present circuit). In the battery-charge control system, the control 24 senses the voltage of battery 16, employs the difference between such voltage and a reference voltage (the error signal) to regulate the phase of the sync signal transmitted from line 10 to sync generator 22, and thereby determines the phase of the inverter output voltage wave in such manner that power is delivered from line 10 to battery 16 to effect recharging thereof. In the phase-control system, and as will be described next in detail, phase control 30 effects a comparison between the phases of the voltage waves sensed by transformers 31 and 32, thereby generating an error signal, which error signal is employed through the combination of elements 35–36 to shift the phase of the sync signal delivered to sync generator 22, thereby shifting the phase of the inverter output voltage wave so that the magnitude of the error signal is lessened.

*Detailed description of the phase control 30*

The phase control 30 constitutes a very important part of the invention in that it is a novel, simple and effective means for achieving the above-described results as well as other results in various fields.

Figure 2:
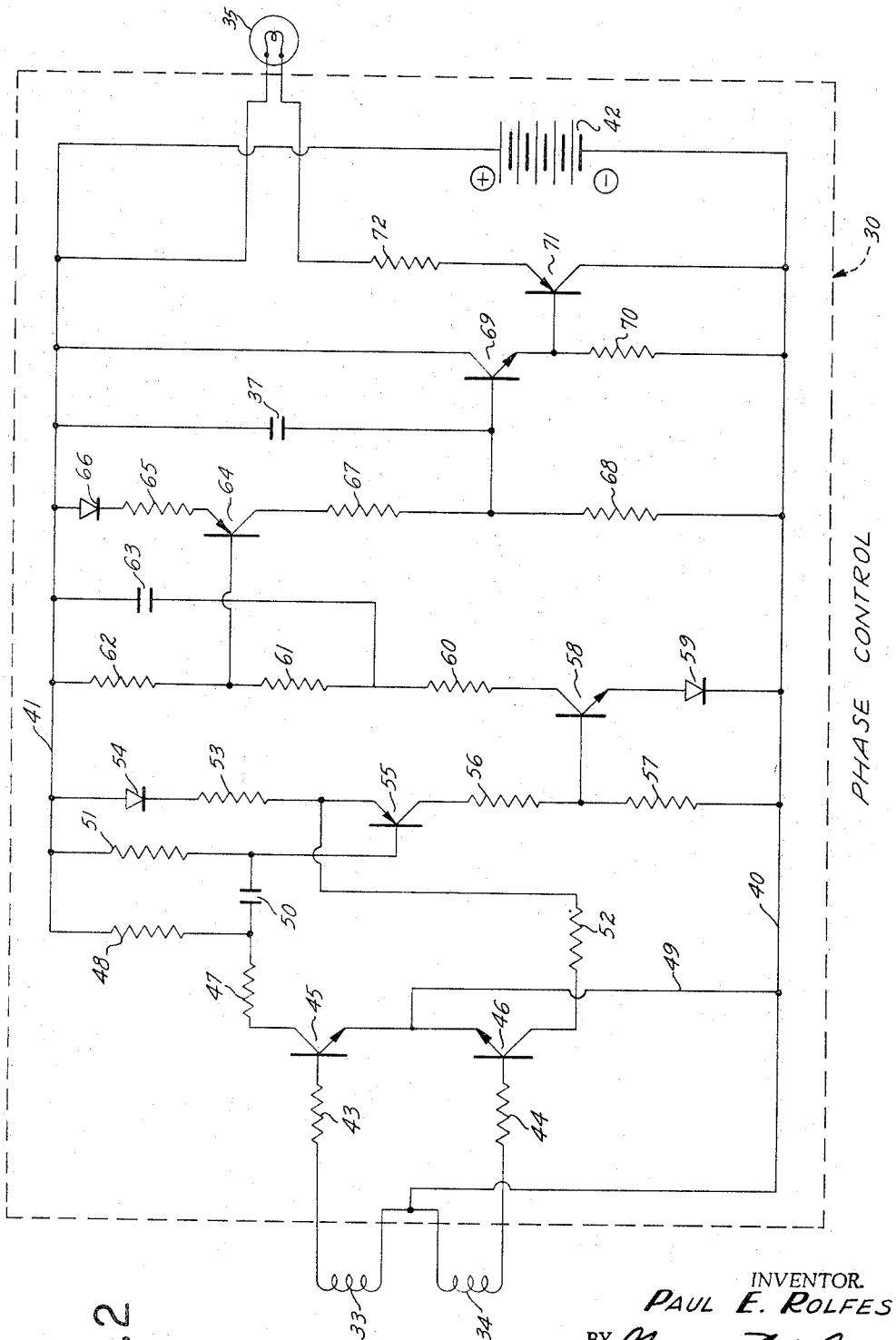

Referring to FIGURE 2 in particular, the secondaries 33 and 34 of transformers 31 and 32 are illustrated as being connected to each other and to a negative D.C. lead 40. Lead 40, and the related positive D.C. lead 41, are supplied with energy from a suitable D.C. source such as the indicated battery 42. It is to be understood that battery 42 may be the same as battery 16, or may be related thereto by suitable voltage-reducing and stabilizing means including, for example, a zener diode.

The remaining terminals of the transformer secondaries are connected, respectively, through current-limiting resistors 43 and 44 to the bases of two NPN transistors 45 and 46. The magnitudes of the voltages present in secondaries 33 and 34 are greatly in excess of the linear base drive ratings of the transistors 45 and 46, so that such transistors are overdriven and produce substantially square-wave outputs.

The collector of transistor 45 is connected through a resistor 47 and a second resistor 48 to the positive lead 41, whereas the emitter of transistor 45 is connected through a lead 49 to the negative lead 40. When transistor 45 is in cut-off condition, the voltage at the collector of transistor 45 is relatively high, such voltage being reduced rapidly when transistor 45 commences to conduct. Thus, a negative-going square-wave pulse is present at the junction between resistors 47 and 48. Such negative-going pulse is differentiated by network including a capacitor 50 and resistor 51. There is, therefore, present at the junction between the capacitor 50 and the resistor 51 a differentiated voltage signal having a steep leading edge and a curved or decaying trailing edge. It is to be understood that the leading edge of such differentiated signal occurs when the line voltage wave sensed by transformer secondary 33 is passing through zero in a positive-going direction.

The emitter of the second transistor, number 46, is also connected through lead 49 to negative lead 40. The collector of such transistor is connected through resistors 52 and 53 and a diode 54 to positive lead 41. Thus, in the manner described relative to transistor 45, a negative-going square-wave signal is developed. In this instance, however, such signal is not differentiated. Furthermore, the magnitude of the signal at the junction of elements 52 and 53 is caused to be slightly greater than the magnitude of the differentiated pulse present at the junction between elements 50 and 51, so that such differentiated pulse may be completely masked by the square-wave signal.

The square-wave signal from transistor 46 is delivered to the emitter of PNP transistor 55, such emitter being connected to the series combination of elements 53 and 54. The differentiated signal present at the junction between elements 50 and 51 is transmitted to the base of such transistor 55. The collector of transistor 55 is connected through resistors 56 and 57 to negative lead 40.

Transistor 55 is normally in cut-off condition due to the back-bias operation of resistors 51 and 53 and the diode 54. The square wave applied to the emitter of transistor 55 is in a direction to maintain the same in cut-off condition, whereas the differentiated pulse transmitted to the base of transistor 55 is in a direction to cause such transistor to conduct. Because the square-wave signal has a greater magnitude than does the differentiated signal, it follows that transistor 55 will remain in cut-off condition at all times when the differentiated pulse is within (masked by) the square-wave pulse. However, during periods when the line voltage wave is leading the inverter voltage wave, at least the leading edge of the differentiated pulse will occur before the leading edge of the square-wave pulse. Transistor 55 will then conduct, but only until occurrence of the square-wave pulse to again cut off the transistor.

It will therefore be understood that the transistor 55 will conduct for an interval determined by the extent to which the line voltage wave leads the output voltage wave from the standby system. Stated otherwise, transistor 55 will conduct for a period determined by the extent to which the inverter voltage wave lags behind the line voltage wave. Transistor 55, and the associated circuitry, thus form a simple phase-sensitive detector, being particularly sensitive to the zero-crossing portions of the line and inverter voltage waves.

Each output pulse from transistor 55 is amplified and converted into square-wave form by an additional transistor, namely the NPN transistor 58. The base of such transistor is connected with the junction between resistors 56 and 57, whereas the emitter of such transistor is connected through a diode 59 to negative lead 40. The collector of transistor 58 is connected through three series-related resistors 60, 61 and 62 to positive lead 41.

When transistor 55 is in conduction, the voltage at the upper end of resistor 57 (remote from lead 40) becomes relatively large, causing transistor 58 to conduct. Thus, the voltage applied to the base of transistor 58 is positive-going. The resulting output of transistor 58 is squared because transistor 58 (similarly to transistors 45 and 46) is overdriven.

A capacitor 63 is connected from positive lead 41 to the junction between resistors 60 and 61, and serves to integrate the output of transistor 58. When transistor 58 is cut off, no charge current can flow into capacitor 63 since there is no connection to negative lead 40. Upon commencement of conduction in transistor 58, a charge current immediately flows from lead 41 into capacitor 63 and thence through resistor 60, transistor 58, and diode 59 to negative lead 40. The longer the transistor 58 is in conduction, the longer will be the flow of charging current into capacitor 63.

There is therefore present at the junction between resistors 61 and 62 a D.C. voltage having a magnitude which is proportional to the phase difference between the line voltage wave and the output voltage wave from the standby system. This is only true, however, during periods when the line voltage wave is leading the inverter voltage wave. During periods when the inverter is leading the line, the differentiated pulse applied to the base of transistor 55 is entirely covered by the square wave applied to the emitter thereof, and there is no output from either transistor 55 or 58.

Resistors 61 and 62 have magnitudes sufficiently great to prevent discharging of capacitor 63 at a high rate. Furthermore, these resistors act as a voltage divider to determine the magnitude of the voltage supplied to the base of an additional PNP transistor, number 64, which serves as a D.C. amplifier. Resistors 61 and 62 also prevent the input impedance of transistor 64 from loading capacitor 63.

The emitter of transistor 64 is connected through a resistor 65 and a diode 66 to positive lead 41. The collector of transistor 64 is connected through series-related resistors 67 and 68 to negative lead 40. Because the side of capacitor 63 remote from lead 41 is negative with respect to lead 41, such negative voltage is transmitted through resistor 61 to the base of transistor 64, maintaining transistor 64 in conductive condition. Resistor 65 and diode 66 combine to reduce thermal drift, since transistor 64 is a D.C. amplifier.

The previously indicated time-delay means 37 is a large capacitor which is connected from positive lead 41 to the junction between resistors 67 and 68. The great majority of the output of the D.C. amplifier transistor 64 is fed to capacitor 37 and stored therein. The time constant of the capacitor 37 and associated resistors is such that any change in phase angle between the line voltage wave and the output voltage wave from the standby system does not affect the output of amplifier 64 (the junction between capacitor 37 and the associated resistors 67–68) until the end of a substantial time interval. Thus, sudden changes in the phases of the voltage waves cannot cause sudden changes in the output signal, such output signal being delivered to the base of an NPN transistor 69. Stated in another manner, the control signal transmitted to transistor 69 can only vary slowly and in a smooth manner, regardless of the rate of variation between the relative phases of the line voltage wave and the output voltage wave from the standby system.

Transistor 69 is connected in emitter-follower relationship, having its emitter connected through resistor 70 to negative lead 40, and having its collector connected directly to positive lead 41. The junction between the emitter of transistor 69 and the resistor 70 is connected to the base of a PNP power transistor 71 the collector of which is connected to negative lead 40. The emitter of the power transistor 71 is connected through a current-limiting resistor 72 to the previously described lamp or bulb 35, the remaining terminal of such lamp being connected to lead 41.

When the line voltage wave leads the inverter voltage wave, a relatively great phase difference causes a proportionately high voltage at the base of transistor 69, and a consequent increase in the conduction in such transistor. Because transistor 69 is connected between the base of transistor 71 and the positive voltage at lead 41, it operates to back-bias the transistor 71. Accordingly, the larger the phase difference between the voltage waves (when the line is leading), the greater the conduction in transistor 69, the lesser the conduction in transistor 71, and the darker the lamp or bulb 35.

In summary, and as previously stated, lamp 35 is relatively dim when there is a large phase difference between the line voltage wave and the output voltage wave from the standby system, and is bright when such voltage waves are in phase with each other. It is important to note that, because of the amplifications created by the various transistors described above, lamp 35 is relatively dim when the phase difference between the line voltage wave and the output voltage wave from the standby system is only a few degrees. Because the phase servo 30 cannot cause the voltage waves to be exactly in phase, as will be noted below, lamp 35 is far from its brightest condition when the voltage waves are within only a few degrees of each other so that the line control 11 may safely be closed. Such closing of line control 11 causes the voltage waves to become exactly in phase, the circuit 30 then tending to cause lamp 35 to achieve substantially its brightest condition. Also as previously described, this change in the brightness of lamp 35 is delayed due to the operation of the capacitor or time-delay means 37.

As in any system in the nature of a position servo, one hundred percent elimination of error signal cannot be achieved. The error signal may only be eliminated when the line voltage wave and the standby system output voltage wave are exactly in phase, but this cannot occur (prior to closing of line control 11) because the differentiated pulse supplied to the base of transistor 35 would then be completely masked by the square-wave pulse supplied to the emitter thereof. The phase error is inversely proportional to the gain of the system, the error being smaller in systems of higher gain. With the circuit described herein, the phase error is on the order of three or four degrees, and does not result in any substantial transient conditions when line control 11 is closed.

Figure 1:
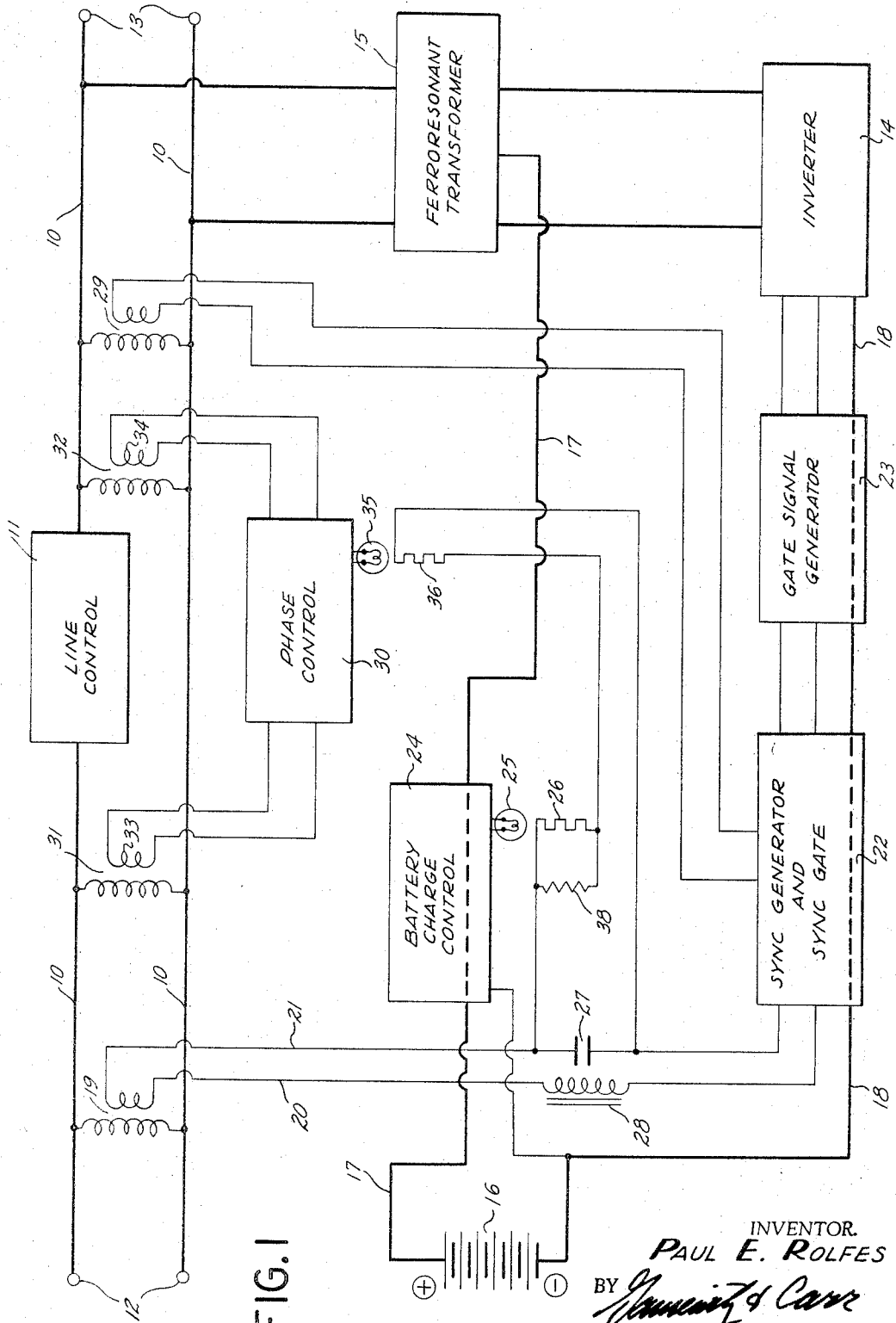

If the output voltage wave from the standby system were leading the line voltage wave, there would be no error signal (the differentiated pulse then being masked by the squarewave pulse at transistor 55), so that transistor 69 would not conduct in substantial amount. Transistor 71 would therefore be permitted to conduct heavily, causing lamp 35 to glow brightly. The light-dependent resistor 36 (FIGURE 1) would thus have a very small resistance and (assuming that lamp 25 is also glowing brightly which is normally the case when line control 11 is open) the capacitor 27 in the phase-shift network would be substantially short-circuited. It follows that the sync signal delivered to sync generator 22 from sensing transformer 19 would be lagging in nature. Such lagging condition would progress until the differentiated pulse (supplied to the base of transistor 55) commenced to lead (occur prior to) the leading edge of the square-wave pulse supplied to the emitter of transistor 55. Such leading would not be greater than is permitted by the phase control 30, however, and would be within the degree of error (such as three or four degrees) indicated above.

The capacitive reactance created by capacitor 27 should be somewhat larger than the inductive reactance created by inductor 28, in order to permit the slight amount of leading needed by the charger to reduce an overcharged battery. As in servo mechanisms in general, the system should be such that the error may be reduced to zero and then made negative, in order to prevent loss of control as the result of overshoots, and to insure that the resulting error will be within the desired range.

Use of the term "transistor" in the appended claims also denotes equivalent components such as electron tubes. Furthermore, transistors of complementary symmetry may be employed (for example, transistor 55 may be an NPN). The combinations 25–26 and 35–36 may be replaced (though much less satisfactorily) by heater-thermistor combinations, or by motor-potentiometer combinations, etc.

The foregoing detailed description is to be clearly understood as given by way of illustration and example only, the spirit and scope of this invention being limited solely by the appended claims.

I claim:
1. A power-supply system, which comprises:
an A.C. voltage transmission means having an input and an output,
a line switch interposed in said transmission means between said input and said output thereof,
   said line switch being selectively adapted to open and thereby prevent transmission of A.C. voltage from said input to said output,
a standby power system connected to said transmission means on the output side of said line switch and adapted to supply an A.C. voltage wave to said output of said transmission means during periods when said line switch is open,
sensing means to sense the phases of voltage waves in said transmission means on the input and output sides of said line switch during periods when said line switch is open,
said sensing means being directly connected to said line switch whereby there is no substantial phase shift between said line switch and said sensing means,
means associated with said sensing means to generate an error signal related to the phase difference between said voltage waves, and
means responsive to said error signal to progressively vary the phase of the voltage wave generated by said standby power system in relation to the phase of the voltage wave present in said transmission means on the input side of said line switch until said voltage waves are substantially in phase with each other,
whereby said line switch may be shifted to closed condition without creating undesired transients in said transmission means.

2. A power-supply system, which comprises:
an A.C. voltage transmission means having an input and an output,
a line switch interposed in said transmission means between said input and said output thereof,
   said line switch being selectvely adapted to open and thereby prevent transmission of A.C. voltage from said input to said output,
a standby power system connected to said transmission means on the output side of said line switch and adapted to supply an A.C. voltage wave to said output of said transmission means during periods when said line switch is open,
sensing means to sense the phases of voltage waves in said transmission means on the input and output sides of said line switch during periods when said line switch is open,
said sensing means being directly connected to said line switch whereby there is no substantial phase shift between said line switch and said sensing means,
means associated with said sensing means to generate an error signal related to the phase difference between said voltage waves,
means responsive to said error signal to progressively vary the phase of the voltage wave generated by said standby power system in relation to the phase of the voltage wave present in said transmission means on the input side of said line switch until said voltage waves are substantially in phase with each other,
whereby said line switch may be shifted to closed condition without creating undesired transients in said transmission means, and
means to cause the power delivered to said output of said transmission means, during periods when said line switch is closed, to be supplied substantially entirely by a power source connected to said input and not by said standby power system.

3. A standby power-supply system adapted to be associated with an A.C. power line through which is normally passed an A.C. voltage wave having a predetermined frequency and magnitude, which system comprises:
a line control interposed in said line to open the same during periods when the voltage supplied to the input of said line is lower than a predetermined desired magnitude,
a ferroresonant transformer having the output thereof connected across said line on the output side of said line control,
an inverter connected between the input of said transformer and a storage battery,
   said inverter being adapted to convert D.C. power from said battery into A.C. power for delivery through said transformer to said line,
means to drive said inverter in frequency synchronism with the A.C. voltage wave in said line,
sensing means to sense the phases of the voltage waves present in said line on the input and output sides of said line control,
said sensing means being connected to said line between said transformer and said line control whereby to eliminate the effects of phase shift in said transformer,
means associated with said sensing means to generate an error signal related to the phase difference between said voltage waves on the input and output sides of said line control during periods when said line control is open, and
means responsive to said error signal to progressively vary the phase of the voltage wave generated by said inverter in relation to the phase of the voltage wave present in said line on the input side of said line control until the voltage waves present in said line on the input and output sides of said line control are substantially in phase with each other, whereby said line control may be shifted to closed condition without creating undesired transients in said line.

4. The invention as claimed in claim 3, in which means are provided to effect a gradual retarding of the phase of the voltage wave generated by said inverter, subsequent to shifting of said line control to closed condition, until the power output of said line is supplied substantially entirely by a power source connected to the input of said line.

5. A power system, which comprises:

A.C. power transmission means having an input and an output, a line control interposed in said transmission means between said input and output thereof, an inverter adapted to supply energy to said transmission means on the output side of said line control, said inverter having an input adapted to be connected to a storage battery, means to derive a sync signal from said transmission means and to employ said sync signal to drive said inverter in frequency synchronism with the A.C. voltage wave normally present in said transmission means, said last-named means including progressively variable phase-shift means to shift the phase of said sync signal and thus the phase of the voltage wave generated by said inverter, phase control means to sense the phases of the voltage waves present in said transmission means on opposite sides of said line control and to generate an error signal determined by the phase difference between said voltage waves on opposite sides of said line control, said phase control means being directly connected to said line on opposite sides of said line control, and means responsive to the magnitude of said error signal to operate said phase-shift means in a manner shifting the phase of the voltage wave generated by said inverter until the voltage waves present in said transmission means on opposite sides of said line control are substantially in phase with each other.

6. A standby power-supply system for use in conjunction with an A.C. power line through which is normally passed an alternating voltage wave having a predetermined frequency and magnitude, which system comprises:

inverter means to receive energy from a storage battery and deliver said energy to said power line during periods of failure of said alternating voltage wave in said line, a line control interposed in said line between the input of said line and the connection between said line and said inverter means, said line control being adapted to be opened during intervals of power failure in order to protect the standby system from conditions such as short circuits in said line, means to drive said inverter means in frequency synchronism with the alternating voltage wave normally present in said line, first phase-shift means operative when said line control is closed to control the phase of voltage wave transmitted to said line from said inverter means in relation to the phase of the alternating voltage wave present in said line on the input side of said line control, said first phase-shift means being automatically responsive to the charge on said storage battery to vary the phase of the inverter voltage wave, relative to the phase of the line voltage wave, in such manner that said storage battery is maintained charged from said line during periods when said line control is closed, and is rapidly recharged from said line following periods when said line control is open, second phase-shift means to progressively vary the phase of said inverter voltage until the alternating voltage wave present in said line on the output side of said line control is substantially in phase, during periods when said line control is open, with the alternating voltage wave on the input side of said line control, and means to cause said second phase-shift means to dominate said first phase-shift means during periods when said line control is open, and to cause said first phase-shift means to dominate said second phase-shift means during periods when said line control is closed.

7. A standby power-supply system for use in conjunction with an A.C. power line through which is normally passed an alternating voltage wave having a predetermined frequency and magnitude, which system comprises:

inverter means to receive energy from a storage battery and deliver said energy to said power line during periods of failure of said alternating voltage wave in said line, a line control interposed in said line between the input of said line and the connection between said line and said inverter means, said line control being adapted to be opened during intervals of power failure in order to protect the standby system from conditions such as short circuits in said line, means to drive said inverter in frequency synchronism with the alternating voltage wave normally present in said line, and means to maintain the voltage wave transmitted to said line from said inverter substantially in phase with the alternating voltage wave present in said line on the input side of said line control, said means including a phase control comprising:

semiconductor means having at least three elements, said means being adapted to conduct when a first one of said elements is negative with respect to a second one of said elements, said means being cut off when said first element is positive with respect to said second element, means to supply to said first element a first voltage pulse of negative polarity and having a phase determined by the phase of one of said voltage waves, means to supply to said second element a second voltage pulse of negative polarity and having a phase determined by the phase of the other of said voltage waves, said second voltage pulse being sufficiently wide and large in magnitude to mask said first voltage pulse whereby said semiconductor means will only conduct when at least a portion of said first voltage pulse is out of registry with said second voltage pulse, and means responsive to the amount of conduction of said semiconductor means to vary the phase of the voltage wave transmitter to said line from said inverter.

8. A method of providing standby power to an A.C. power line through which is normally passed a voltage wave having a predetermined frequency and magnitude, said power line having a line control switch therein, which method comprises:

coupling the output of a battery-inverter standby power-supply system to said line on the output side of said line control switch and by means of a coupling element permitting a substantial degree of phase difference to exist between the output voltage wave from said standby system and the voltage wave present in said line, operating said standby system continuously and in frequency synchronism with said line voltage wave, opening said line control switch during periods when the A.C. line voltage is dead, progressively shifting the phase of the output voltage wave from said standby system in response to resumption of A.C. voltage on the input side of said line control switch and until the voltage waves on the input and output sides of said line control switch are substantially in phase with each other, closing said line control switch, and thereafter retarding the phase of the output voltage wave from said standby system sufficiently to prevent undesirable discharge of the battery portion of such standby system.

9. The invention as claimed in claim 8, in which said step of retarding said output voltage wave is effected smoothly and over a substantial time period, thereby avoiding undesirable transients in said line.

10. The invention as claimed in claim 8, in which said method includes the step of effecting a rough correlation between the phases of the voltage waves on opposite sides of said line control prior to said step of progressively shifting relative phases until said voltage waves are substantially in phase with each other, thereby insuring that said voltage waves on opposite sides of said line control are not substantially one-hundred eighty degrees out of phase with each other.

11. A standby power-supply and battery-charging apparatus, which comprises:

a line control adapted to be interposed in an A.C. power line between the input and output ends thereof,
  said line control being adapted to open said line when the A.C. voltage wave therein is not within a desirable tolerance range, an SCR inverter incorporating reactance diodes, the input of said inverter being adapted to be connected to a storage battery, means including a ferroresonant transformer to connect the output of said inverter to said line on the output side of said line control, means to derive a sync signal from said line on the input side of said line control and to employ said sync signal to drive said inverter in frequency synchronism with the A.C. voltage wave present in said line, battery-charge control means responsive to the voltage of said battery to shift the phase of said sync signal and thus the phase of the output voltage wave from said inverter in a manner maintaining said battery in charged condition during periods when said line control is closed, and also effecting rapid re-charging of said battery subsequent to intervals during which said line control is open, phase-control means responsive to the phases of the voltage waves present in said line on opposite sides of said line control during periods when said line control is open to shift the phase of said sync signal and thus the phase of the output voltage wave from said inverter until voltage waves present in said line on opposite sides of said line control are substantially in phase with each other, and means to prevent said battery-charge control means from adversely affecting said phase-control means during periods when said line control is open, and to prevent said phase-control means from adversely affecting said battery-charge control means during periods when said line control is closed.

12. A phase-control system, which comprises:

first and second transistor means to generate first and second voltage pulse trains the phases of which are determined by the phases of voltage waves to be controlled, third transistor means to generate an output determined by the degree of phase difference between said voltage pulse trains, integrator means to integrate said output of said third transistor means to thereby generate a D.C. voltage the magnitude of which is related to the phase difference between said voltage pulse trains, a time-delay capacitor adapted to be charged in response to the voltage of said integrator means,
  said time-delay capacitor being sufficiently large to prevent a rapid change in the voltage thereacross, amplifier means responsive to the voltage across said capacitor to generate an output voltage, and means responsive to said output voltage to shift the phase of at least one of said voltage waves.

13. A power system, which comprises:

A.C. power transmission means having an input and an output, a line control interposed in said transmission means, between said input and output thereof, to open and close said transmission means, an inverter adapted to supply energy to said transmission means on the output side of said line control,
  said inverter having an input adapted to be connected to a storage battery, means to derive a sync signal from said transmission means and to employ said sync signal to drive said inverter in frequency synchronism with the A.C. voltage wave normally present in said transmission means,
  said last-named means including progressively variable phase-shift means to shift the phase of said sync signal and thus the phase of the voltage wave generated by said inverter, phase-control means to sense the phases of the voltage waves present in said transmission means on opposite sides of said line control when said line control is open and to generate an error signal determined by the phase difference between said voltage waves on opposite sides of said line control,
  said phase-shift and phase-control means including a capacitor and an inductor, and a light bulb adapted to glow with varying degrees of brightness in accordance with the magnitude of said error signal, and means responsive to the magnitude of said error signal to operate said phase-shift means in a manner shifting the phase of the voltage wave generated by said inverter until the voltage waves present in said transmission means on opposite sides of said line control, when said line control is open, are substantially in phase with each other,
  said last-named means comprising a light-dependent variable resistor optically coupled with said light bulb and shunted across said capacitor to thereby control the effective capacitive reactance of said capacitor in accordance with the magnitude of said error signal.

14. A power system, which comprises:

A.C. power transmission means having an input and an output, a line control interposed in said transmission means between said input and output thereof, an inverter adapted to supply energy to said transmission means on the output side of said line control,
  said inverter having an input adapted to be connected to a storage battery, means to derive a sync signal from said transmission means and to employ said sync signal to drive said inverter in frequency synchronism with the A.C. voltage wave normally present in said transmission means, said last-named means including progressively variable phase-shift means to shift the phase of said sync signal and thus the phase of the voltage wave generated by said inverter, phase control means to sense the phases of the voltage waves present in said transmission means on opposite sides of said line control and to generate an error signal determined by the phase difference between said voltage waves on opposite sides of said line control, means responsive to the magnitude of said error signal to operate said phase-shift means in a manner shifting the phase of the voltage wave generated by said inverter until the voltage waves present in said transmission means on opposite sides of said line control are substantially in phase with each other, and a sync gate to prevent transmission of said sync signal to said inverter during periods when the voltage waves present in said transmission means on opposite sides of said line control are not generally in phase with each other.

15. A standby power-supply and battery-charging apparatus, which comprises:

a line control adapted to be interposed in an A.C. power line between the input and output ends thereof,
said line control being adapted to open said line when the A.C. voltage wave therein is not within a desirable tolerance range, an SCR inverter incorporating reactance diodes, the input of said inverter being adapted to be connected to a storage battery, means including a ferroresonant transformer to connect the output of said inverter to said line on the output side of said line control, means to derive a sync signal from said line on the input side of said line control and to employ said sync signal to drive said inverter in frequency synchronism with the A.C. voltage wave present in said line,
said means including a reactance element, battery-charge control means responsive to the voltage of said battery to shift the phase of said sync signal and thus the phase of the output voltage wave from said inverter in a manner maintaining said battery in charged condition during periods when said line control is closed, and also effecting re-charging of said battery subsequent to intervals during which said line control is open, and phase-control means responsive to the phases of the voltage waves present in said line on opposite sides of said line control during periods when said line control is open to shift the phase of said sync signal and thus the phase of the output voltage wave from said inverter until said voltage waves present in said line on opposite sides of said line control are substantially in phase with each other, said battery-charge control means and said phase-control means each including a lamp and an associated light-dependent variable resistor,
said resistors being connected in series-circuit relationship relative to each other,
the series combination of said resistors being connected in shunt with said reactance element.

16. The invention as claimed in claim 15, in which said battery charge-control means is adapted to cause the associated lamp to glow relatively brightly during periods when said battery is relatively discharged, and in which said phase-control means is adapted to cause the associated lamp to glow relatively brightly during periods when said voltage waves present in said line on opposite sides of said line control are substantially in phase with each other.

17. The invention as claimed in claim 15 in which a fixed resistor is shunted across said light-dependent resistor associated with said battery-charge control means, the magnitude of said fixed resistor being sufficiently small to prevent said battery-charge control means from dominating said phase-control means during periods when said line control is open, the magnitude of said fixed resistor being sufficiently large to permit said light-dependent resistor associated with said battery-charge control lamp to effectively control the amount of shunt current around said reactance element during periods when said line control is closed.

References Cited

UNITED STATES PATENTS

| | | | |
|---|---|---|---|
| 1,951,482 | 3/1934 | Holden | 307—64 |
| 2,838,685 | 6/1956 | Stineman | 307—87 |
| 2,929,941 | 3/1960 | Bobo | 307—87 |
| 3,229,111 | 1/1966 | Schumacher | 307—64 |

ORIS L. RADER, *Primary Examiner.*

T. J. MADDEN, *Assistant Examiner.*